(12) United States Patent
Lee et al.

(10) Patent No.: US 9,933,896 B2
(45) Date of Patent: Apr. 3, 2018

(54) TOUCH PANEL AND METHOD OF MANUFACTURING A TOUCH PANEL

(76) Inventors: Yuh-Wen Lee, Zhubei (TW); Ching-Shan Lin, Tainan (TW); Lichun Yang, Xiamen (CN); Fang Fang, Xiamen (CN)

( * ) Notice: Subject to any disclaimer, the term of this patent is extended or adjusted under 35 U.S.C. 154(b) by 442 days.

(21) Appl. No.: 13/311,556

(22) Filed: Dec. 6, 2011

(65) Prior Publication Data
US 2012/0249441 A1    Oct. 4, 2012

(30) Foreign Application Priority Data
Apr. 4, 2011  (CN) .......................... 2011 1 0097222

(51) Int. Cl.
*G06F 3/044*    (2006.01)

(52) U.S. Cl.
CPC .... *G06F 3/044* (2013.01); *G06F 2203/04103* (2013.01)

(58) Field of Classification Search
CPC ......... G06F 3/0412; G06F 2203/04103; G06F 2203/04111; G06F 1/16; G06F 2203/04112
See application file for complete search history.

(56) References Cited

U.S. PATENT DOCUMENTS

| | | | |
|---|---|---|---|
| 7,259,106 B2* | 8/2007 | Jain | ............................... 438/737 |
| 8,178,383 B2* | 5/2012 | Liu et al. | ........................ 438/70 |
| 2007/0131976 A1* | 6/2007 | Kanno | ..................... H01L 27/12 |
| | | | 257/223 |
| 2010/0141608 A1 | 6/2010 | Huang et al. | |
| 2011/0006998 A1* | 1/2011 | Kang | ....................... G06F 3/044 |
| | | | 345/173 |
| 2012/0127578 A1* | 5/2012 | Bright | .................... G02B 1/116 |
| | | | 359/585 |

FOREIGN PATENT DOCUMENTS

| | | | |
|---|---|---|---|
| CN | 1867882 | A | 11/2006 |
| CN | 101078820 | * | 11/2007 |
| TW | 200916884 | | 12/2010 |
| WO | WO2006007071 | A1 | 1/2006 |

* cited by examiner

*Primary Examiner* — Jennifer Mehmood
*Assistant Examiner* — Parul Gupta

(57) ABSTRACT

The present invention discloses a touch panel and a method of manufacturing a touch panel, to reduce the visibility of the transparent etching line of the transparent electrodes on the touch panel. The touch panel comprises a plurality of transparent electrode disposed distantly on the transparent conductive layer and the passivation layer of a transparent substrate, where the passivation layer covering the transparent conductive layer, to make the refractive index of the passivation layer and the transparent electrodes match with each other. Oxide with high refractive index added in the passivation material is filled in the etched area of the transparent conductive layer, so that the optical refractive index of the etched area and ITO area on transparent conductive layer become closer, and the difference in refractive index curve between ITO area and etched area is reduced, therefore, the effect of making the transparent electrode pattern is achieved.

19 Claims, 3 Drawing Sheets

TOUCH PANEL AND METHOD OF MANUFACTURING A TOUCH PANEL

BACKGROUND OF THE INVENTION

This Application claims the benefit of the People's Republic of China. Application No. 201110097222.6, filed on Apr. 4, 2011.

FIELD OF THE INVENTION

The present invention generally relates to touch technology, and more particular to a touch panel and method of manufacturing a touch panel, to improve the appearance and optical performance of touch panel.

DESCRIPTION OF THE RELATED ART

Nowadays, with the development of touch technology, touch panels are widely used in many electronic products, such as cell phones, personal digital assistants (PDAs), game input interfaces, or computer touch screens. The touch panel is always integrated with a display panel. It is convenient for a user to select an option by touching a displayed image on the display panel to start its corresponding operation.

According to different technology principles, there are many types of touch panels, such as resistance touch panel, capacitive touch panel, infrared sensing touch panel, electromagnetic sensing touch panel, and acoustic wave sensing touch panel. Herein, the capacitive touch panel is a comparatively better type because of its high sensitivity, low cost, and simple structure. Theoretically, the capacitive touch panel works by sensing capacitance of bodies in contact. When a user touches the capacitive touch panel, partial electric charges will be taken away to generate electrical current signals and the current signals will then be sent to a controller. The controller will compute the touch position from received signals.

Generally, a conventional touch panel includes a transparent substrate and a transparent conductive layer. The transparent conductive layer made of transparent conducting material, like Indium Tin Oxide (ITO), is formed on the transparent substrate which is non-conducting. The conducting material is etched and formed certain electrode pattern on the transparent conductive layer, such as intersecting pattern in two perpendicular directions of the coordinate system, or parallel spacing patterning in the same direction.

The electrode pattern includes two areas, ITO area and etched area without ITO for exposing the transparent substrate. Due to the difference between refractive index in the two areas, the etching line dividing ITO area and etched area are visible to users, and situations like a discontinuous layer, a blurred image, lowering the display quality. When in use, for users' convenience in touching, the transparent conductive glass of the touch panel should be pressed on substrate glass, usually done with OCA (Optically clear adhesive). Although OCA could improve the display quality to some extent, the problem of visible etching line still could not be solved.

The CN101078820A discloses a method of hiding transparent electrodes on a transparent substrate. As shown in FIG. 1, a non-conductive nanoparticles layer 31 made of other oxides of similar refractive index with ITO, such as Sb2O3 and TiO2 is coated onto the transparent substrate. As these materials have a high refractive index, the nanoparticles layer should be kept thin, or the optical transmission would be reduced, and the haze of the transparent conductive layer would be enlarged. Therefore, the nanoparticles layer need to be covered with another protecting layer, usually made of SiO2 or organic polymer. After being baked under high temperature, the nanoparticles layer would become weak in adhesive power and rigidity. In addition, in this method, the etching lines will become invisible only after the bonding of optical cement and substrate glass, which prolongs the manufacturing process, makes the procedure complicated and also increases the cost.

SUMMARY OF THE INVENTION

Therefore, an objective of the present invention is to provide a touch panel with improved appearance and optical performance, avoid discontinuous layer and blurred image, and lower the cost.

A touch panel comprises a conductive layer and a passivation layer. The conductive layer comprises a plurality of transparent electrodes covered by the passivation layer. The passivation layer comprises a component selected from transparent metallic oxide with refractive index higher than 1.8.

Another objective of the present invention is to provide a method of manufacturing a touch panel, to reduce the visibility of etching lines in a touch panel. The present invention can be practiced as a convenient solution with high yield rate and low cost, and help achieve a better optical performance.

A method of manufacturing a touch panel, is to cover a transparent electrode layer on a substrate with a passivation layer, which has the matching refractive index with the transparent electrode layer. The method comprises a step of adding transparent metallic oxide with refractive index higher than 1.8 into a passivation material and a step of covering the passivation material on transparent electrodes to form a passivation layer, to make the refractive index of the passivation layer and the transparent electrodes match with each other. The method further comprises the following steps: disposing transparent electrodes on the transparent substrate; adding transparent metallic oxide with refractive index higher than 1.8 into the material of the passivation layer, and also adding dispersant to make the transparent metallic oxide spread evenly into the passivation material; covering the transparent electrode with the passivation layer using the passivation material.

The present invention provides a touch panel and the method to make the etching lines of the transparent electrodes thereon invisible. The method is to directly use passivation material with high refractive index to cover on the transparent electrodes, reducing the difference of refractive index between etched area and transparent electrodes area, to effectively avoid the problems like low display quality due to difference of refractive index, so that the touch panel could have better optical performance.

DETAILED DESCRIPTION OF THE DRAWINGS

Figure 1:
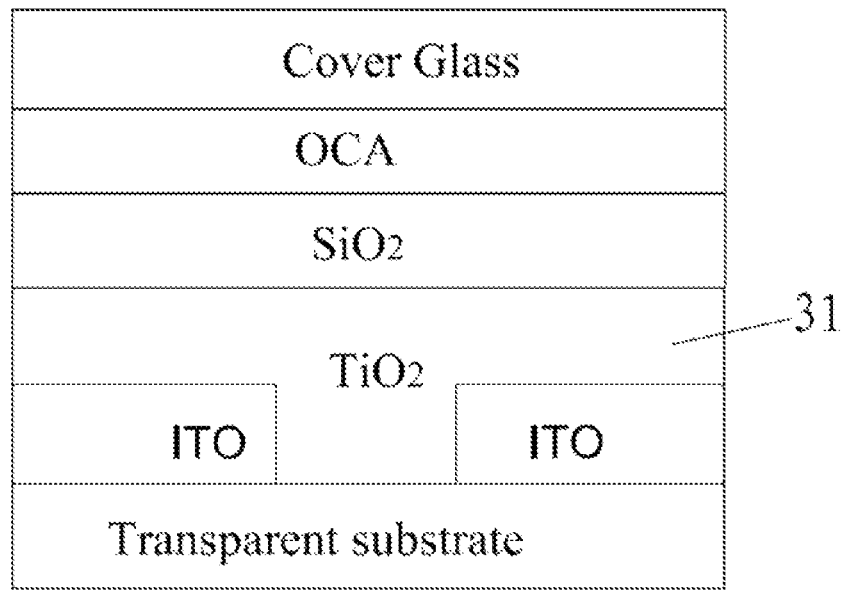
FIG. 1 is a view of the layer structure of a conventional capacitive touch panel.
Figure 2:
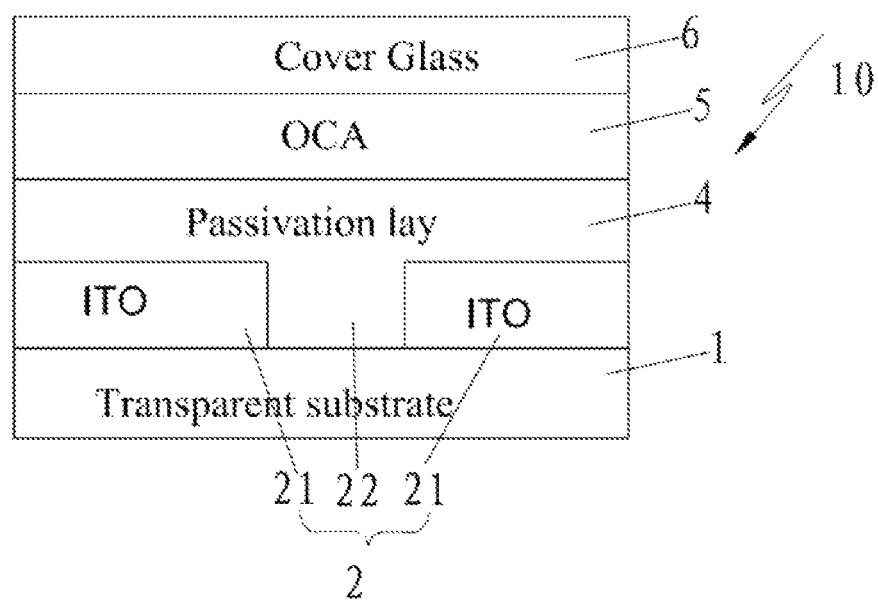
FIG. 2 is a view of the layer structure of a touch panel of the present invention.

Referring to FIG. 2, a touch panel 10 comprises a transparent substrate 1, a transparent electrode layer 2 and a passivation layer 4, while the transparent electrode layer 2 is made of transparent conductive material like ITO. The transparent electrode layer 2 comprises a plurality of transparent electrodes 21, disposed on the transparent substrate 1 discontinuously to form a electrode pattern, which could be divided into etched area 22 and ITO area where the transparent electrodes 21 lie. The etched area 22 is not covered by ITO material. The transparent electrode layer 2 is covered by the passivation layer 4, the material of which is filled in the etched area 22. The passivation layer 4 protects and fences the transparent electrode layer 2. The passivation layer 4 could bond with a cover glass 6 by optical cement like OCA (Optically Clear Adhesive) 5, to form the touch panel 10.

Transparent metallic oxide with refractive index larger than 1.8 is added into the material of passivation layer 4, in order to increase the refractive index of passivation layer 4, so that the refractive index of the passivation layer 4 and ITO area where the transparent electrode 21 lie match with each other. The material of the passivation layer 4 is mainly polysiloxane. Adding titanium dioxide with higher refractive index into the material, the refractive index of the passivation layer 4 would become 1.6-2.0. The proportion of titanium dioxide in the passivation material is between 1%-20% (calculated by weight before covering), and 1%-10% of silicon oxide (calculated by weight) is added into the passivation layer, so that titanium dioxide could spread evenly within the passivation material.

Figure 3:
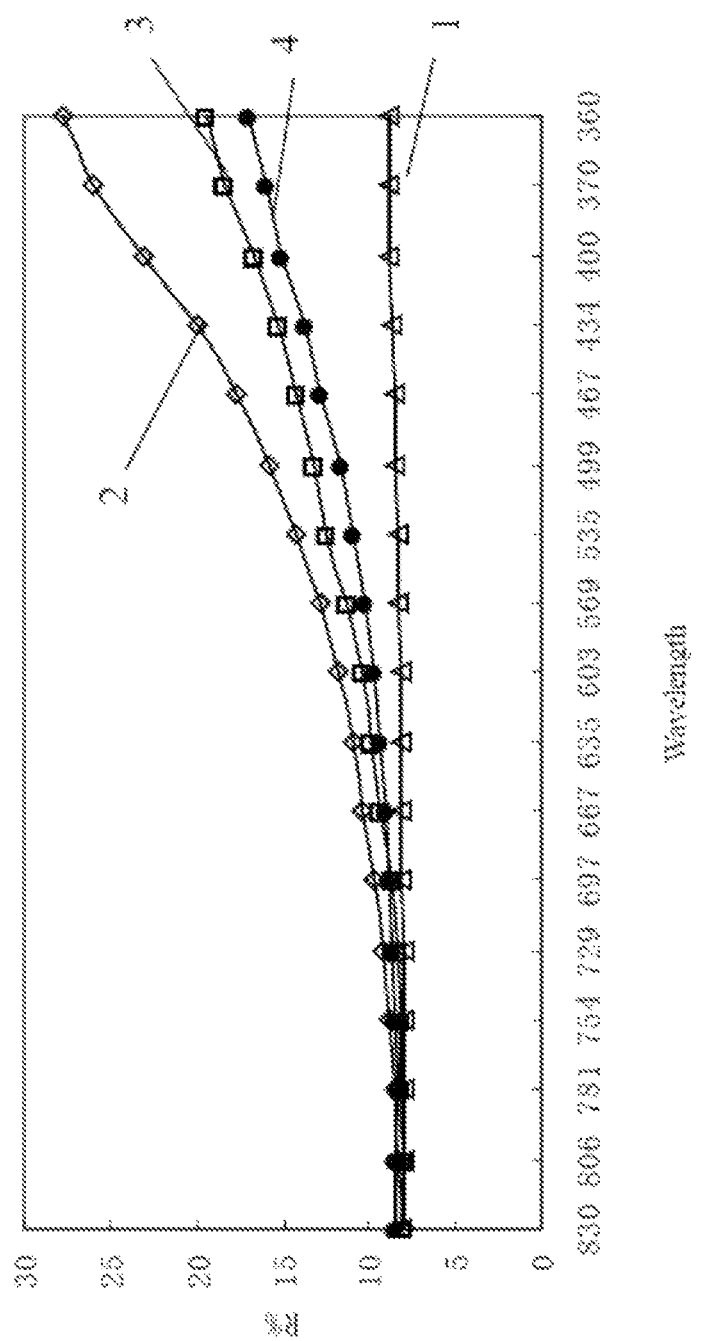
FIG. 3 is a curve graph of reflectivity of the touch panel in FIG. 2 before and after making a passivation layer of the touch panel.

Theoretically, the problem that the etching lines of transparent electrodes could be seen is mainly due to the large difference of refractive index between the transparent electrode 21 (ITO area) and the periphery area (etched area 22). The transparent substrate 1 is made of transparent materials, such as glass, PMMA, PVC, PP or PET, which has the refractive index between 1.4-1.5, while the refractive index of ITO in ITO area is between 1.8-2.2. Because the difference of refractive index causes obvious difference of refractive index curve between ITO area and the etched area 22, so that human eyes could easily detect it. The present invention fills passivation material into the etched area 22, and the material consists of oxide with high refractive index, so that the optical reflectivity of the etched area 22 becomes closer to that of ITO area, reducing the difference in refractive index curve, and therefore the transparent electrode pattern will be invisible. Adding titanium dioxide with high refractive index (between 2.3-2.75) into material of the passivation layer 4 could raise the refractive index of the passivation layer, and further reduce the difference with transparent electrode of reflectivity and refractive index to light, and make it invisible to human eyes. FIG. 3 shows the refractive index curve chart of the touch panel surface before and after making the passivation cover of present invention. Curve 1 is the refractive index curve of the transparent substrate 1; Curve 2 is the refractive index curve of the transparent substrate 1 after being covered by ITO; Curve 3 is the refractive index curve of patterned transparent conductive layer 2 after being covered by passivation material with oxide of high refractive index; and Curve 4 is the refractive index curve of the transparent substrate 1 after being covered by passivation layer with oxide of high refractive index. Compared with difference between Curve 1 and Curve 2, the difference between Curve 3 and Curve 4 is reduced obviously. Therefore, it could be concluded that after covering the passivation layer of matching refractive index, the difference between surface refractive index could be reduced obviously, which makes it invisible to human eyes, so that it provides a capacitive touch panel with better optical performance.

Figure 4:
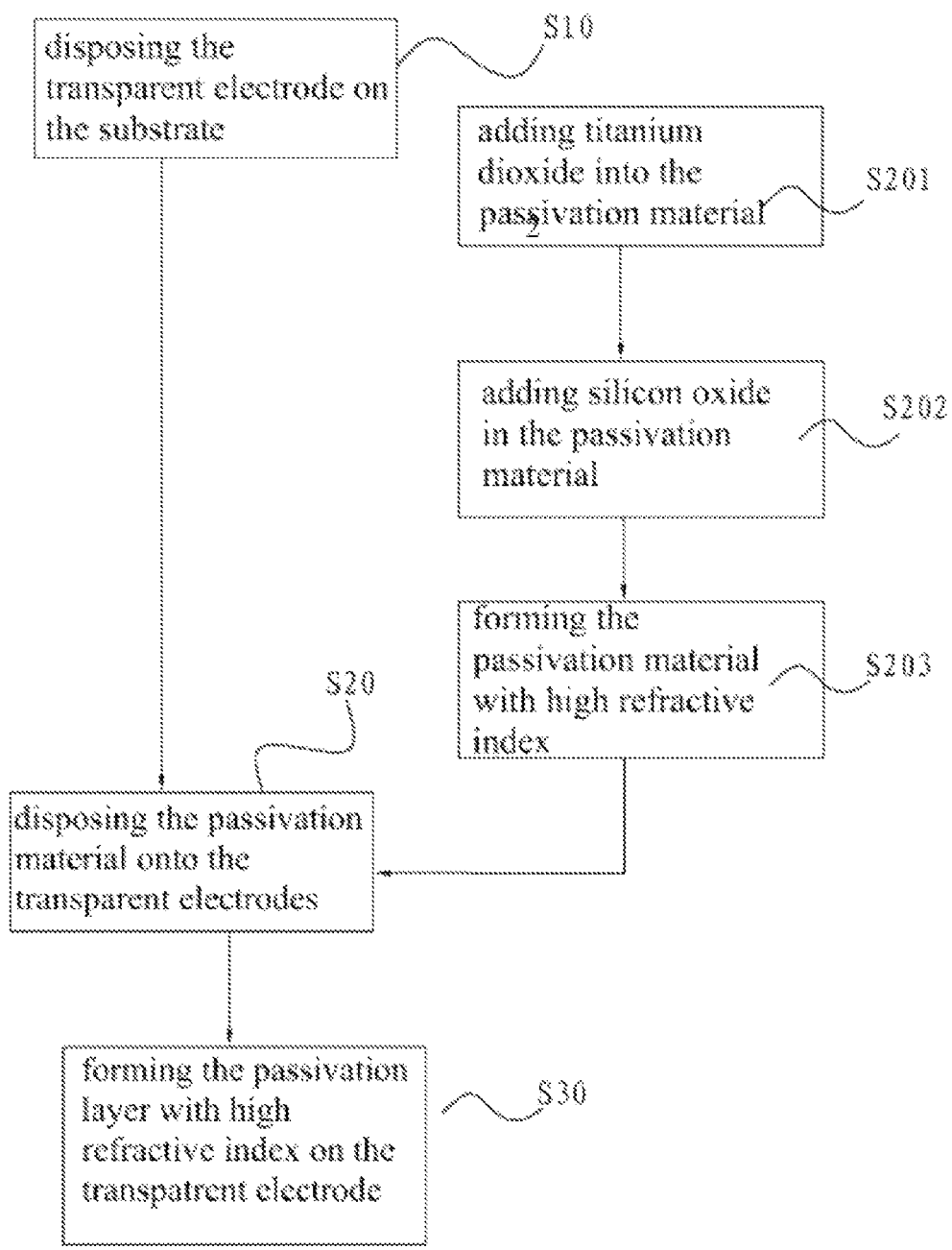
FIG. 4 is a flow chart showing the method of reducing the visibility of etching lines on the touch panel.

In addition, the thickness of the passivation layer 4 is 0.5-3 µm, preferably between 1.1-3 µm, wherein the thickness of ITO in the transparent conductive layer 2 is generally between 20-30 nm. In FIG. 4, Curve 3 is the refractive index curve when the thickness of passivation layer 4 is about 1.5-2 µm. The passivation layer 4 is of deactivation function, which could keep the transparent conductive layer from being contact with outside environment, being oxidized or scratched, and leading to reduction in yield rate.

Referring to FIG. 4, a method of reducing the visibility of etching lines on touch panel comprises: S10, a plurality of transparent electrodes 21 are disposed on a transparent substrate 1; S20, the transparent substrate 1 and the transparent electrodes 21 are covered by passivation material, which has transparent metallic oxide with refractive index higher than 1.8, so that the refractive index to light of the passivation layer 4 and the transparent electrode 21 are becoming closer, and the matching effect is achieved; S30, baking and forming the passivation layer 4, after being baked in temperature above 200° C. for 30 to 60 minutes, the passivation layer 4 with high refractive index would be formed on the transparent electrode 21.

Before covering with the passivation layer, transparent metallic oxide particles with refractive index higher than 1.8 would be added into the passivation material, which is mainly made of polysiloxane. It comprises the following steps: S201, adding titanium dioxide (transparent metallic oxide particles) into the passivation material; S202, also adding silicon oxide (the dispersant) to make the transparent metallic oxide particles evenly spread in the passivation material; S203, forming the passivation material with high refractive index, which is between 1.6 and 2.0. Solutions such as silicon oxide or other dispersing agent added in the passivation material could help with the dissolving and spreading of titanium dioxide, so that the titanium dioxide could evenly spread in the passivation material.

It is proved by tests that, refractive index of passivation layer 4 and the amount of titanium dioxide has a positive relationship, where more amount of titanium dioxide is added, refractive index of passivation layer 4 increases. Table 1 shows the relationship between the amount of titanium dioxide added and the refractive index of passivation layer 4 in testing. By changing the amount of titanium dioxide, the refractive index of passivation layer 4 could be adjusted.

TABLE 1

| The refractive index of passivation layer | Amount of TiO2 | Amount of SiO2 |
| --- | --- | --- |
| 1.6 | 1-10% | 1-5% |
| 1.7 | 2-15% | 2-7% |
| 1.75 | 3-18% | 2-8% |
| 1.8 | 8-20% | 3-10% |
| 2.0 | 10-20% | 3-10% |

The titanium dioxide could be replaced by zirconium dioxide, which has the refractive index between 1.9 and 2.3, and the refractive index of the passivation layer could be between 1.6 and 2.0 according to different proportion of adding amount, so that it could be matching with the refractive index of transparent electrodes. The theory is the same with that of titanium dioxide, so further explanation is not necessary.

Although embodiments of the present invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A touch panel, comprising:
a substrate;
a conductive layer discontinuously disposed on the substrate to form a plurality of transparent electrodes; and
a passivation layer, wherein:
the substrate and the plurality of transparent electrodes are covered by the passivation layer,
the passivation layer is filled in an area between two adjacent transparent electrodes of the plurality of transparent electrodes,
the passivation layer comprises a main material of polysiloxane and a transparent metallic oxide mixed with the main material,
the transparent metallic oxide has a refractive index higher than 1.8,
a refractive index of the passivation layer and a refractive index of the plurality of transparent electrodes match with each other,
a proportion of the transparent metallic oxide in the passivation layer is between 1% and 20% by weight; and
the transparent metallic oxide is spread in the passivation layer due to the presence of a dispersant of silicon oxide in the passivation layer, and a proportion of the dispersant of silicon oxide in the passivation layer is between 1% and 10% by weight.

2. The touch panel according to claim 1, wherein the transparent metallic oxide comprises titanium dioxide.

3. The touch panel according to claim 1, wherein the transparent metallic oxide comprises zirconium dioxide.

4. The touch panel according to claim 1, wherein the refractive index of the passivation layer is between 1.6 and 2.0.

5. The touch panel according to claim 1, wherein a thickness of the passivation layer is between 0.5 and 3 μm.

6. The touch panel according to claim 1, wherein the plurality of transparent electrodes are disposed on the substrate.

7. A method of manufacturing a touch panel, comprising:
disposing a plurality of transparent electrodes on a transparent substrate;
adding a transparent metallic oxide with a refractive index higher than 1.8 into a main material of polysiloxane to form a passivation material;
adding a dispersant of silicon oxide to the passivation material with the main material of polysiloxane to help the transparent metallic oxide spreading and dissolving in the passivation material;
covering the passivation material on the plurality of transparent electrodes and filling an area between two adjacent transparent electrodes of the plurality of transparent electrodes with the passivation material; and
baking the passivation material to form a passivation layer, wherein:

a refractive index of the passivation layer and a refractive index of the plurality of transparent electrodes match with each other,
a proportion of the transparent metallic oxide in the passivation layer is between 1% and 20% by weight; and
a proportion of the dispersant of silicon oxide in the passivation layer is between 1% and 10% by weight.

8. The method according to claim 7, wherein the transparent metallic oxide comprises titanium dioxide.

9. The method according to claim 7, wherein the refractive index of the passivation layer is between 1.6 and 2.0.

10. The touch panel according to claim 1, wherein the passivation layer is in contact with the transparent substrate and lateral sides of the adjacent transparent electrodes.

11. The method according to claim 7, wherein the passivation layer is in contact with the transparent substrate and lateral sides of the adjacent transparent electrodes.

12. The touch panel according to claim 1, wherein the transparent metallic oxide comprises a plurality of transparent metallic oxide particles spread in the main material.

13. The method according to claim 7, wherein the disposing a plurality of transparent electrodes on a transparent substrate comprises:
providing a transparent conductive layer on the transparent substrate; and
patterning the transparent conductive layer to form the plurality of transparent electrodes on the transparent substrate.

14. The method according to claim 7, wherein the transparent metallic oxide comprises zirconium dioxide.

15. A touch panel, comprising:
a substrate;
a plurality of transparent electrodes formed on the substrate and separated by an etched area; and
a passivation layer, wherein:
the passivation layer is filled in the etched area,
the passivation layer comprises a main material of polysiloxane, a transparent metallic oxide mixed with the main material, and a dispersant of silicon oxide,
the transparent metallic oxide has a refractive index higher than 1.8,
a refractive index of the passivation layer and a refractive index of the plurality of transparent electrodes match with each other,
a proportion of the transparent metallic oxide in the passivation layer is between 1% and 20% by weight; and
a proportion of the dispersant of silicon oxide in the passivation layer is between 1% and 10% by weight.

16. The touch panel according to claim 15, wherein the transparent metallic oxide comprises zirconium dioxide or titanium dioxide.

17. The touch panel according to claim 15, wherein the transparent metallic oxide comprises titanium dioxide, the proportion of the transparent metallic oxide in the passivation layer is between 8% and 20% by weight; and a proportion of the dispersant of silicon oxide in the passivation layer is between 3% and 10% by weight.

18. The touch panel according to claim 15, wherein the transparent metallic oxide comprises titanium dioxide, the proportion of the transparent metallic oxide in the passivation layer is between 10% and 20% by weight; and a proportion of the dispersant of silicon oxide in the passivation layer is between 3% and 10% by weight.

19. The touch panel according to claim 15, wherein the passivation layer has a surface with an adhesive layer formed thereon; and a cover glass is bonded with the adhesive layer.

\* \* \* \* \*